US012434062B1

(12) United States Patent
Wei et al.

(10) Patent No.: US 12,434,062 B1
(45) Date of Patent: Oct. 7, 2025

(54) NERVE STIMULATOR

(71) Applicant: BCIFLEX MEDICAL TECHNOLOGY CO., LTD., Beijing (CN)

(72) Inventors: Kaihan Wei, Beijing (CN); Rongfeng Zhang, Beijing (CN); Wenbo Gu, Beijing (CN); Qi Song, Beijing (CN); Guiqiang Yang, Beijing (CN); Huihui Tian, Beijing (CN); Xiudong Lu, Beijing (CN); Chengli Li, Beijing (CN); Bo Zeng, Beijing (CN)

(73) Assignee: BCIFLEX MEDICAL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/214,366

(22) Filed: May 21, 2025

(30) Foreign Application Priority Data

Oct. 10, 2024 (CN) .......................... 202411407619.4

(51) Int. Cl.
*A61N 1/00* (2006.01)
*A61N 1/05* (2006.01)
(Continued)

(52) U.S. Cl.
CPC .......... *A61N 1/3754* (2013.01); *A61N 1/0551* (2013.01); *A61N 1/37229* (2013.01); *A61N 1/3787* (2013.01)

(58) Field of Classification Search
CPC ................ A61N 1/3754; A61N 1/0551; A61N 1/37229; A61N 1/3787; A61N 1/3605–3611; A61N 1/3752–3758
See application file for complete search history.

(56) References Cited

U.S. PATENT DOCUMENTS

| 2012/0022551 A1 | 1/2012 | Staunton et al. |
| 2012/0071951 A1 | 3/2012 | Swanson |
| 2015/0051676 A1 | 2/2015 | Van Funderburk |

FOREIGN PATENT DOCUMENTS

| CN | 105105844 | 12/2015 |
| CN | 109364369 | 2/2019 |

(Continued)

OTHER PUBLICATIONS

Notice of Grant of Patent Right from corresponding Chinese Appln. No. 202411407619.4, dated Nov. 15, 2024. English translation attached.

*Primary Examiner* — Scott M. Getzow
(74) *Attorney, Agent, or Firm* — Grossman, Tucker, Perreault & Pfleger, PLLC (57) ABSTRACT

A nerve stimulator. The nerve stimulator includes: a mid-shell, a stimulation acquisition module mounted within the mid-shell, a feed-through component being disposed on an end surface of the mid-shell and being electrically connected to the stimulation acquisition module, a mounting cover being mounted on the end surface of the mid-shell and covering an outer side of the feed-through component, and a flexible electrode being connected to one side of the feed-through component toward the mounting cover and extending from the end surface to an side surface of the mid-shell. The nerve stimulator of the embodiment of the present disclosure adopts a miniature installation design, which effectively reduces damage to tissues and facilitates the expansion of the number of electrode channels. In addition, the overall sealing property of the device is significantly improved by the multi-layer sealing structure.

20 Claims, 6 Drawing Sheets

(51) Int. Cl.
*A61N 1/372* (2006.01)
*A61N 1/375* (2006.01)
*A61N 1/378* (2006.01)

(56) References Cited

FOREIGN PATENT DOCUMENTS

| | | |
|---|---|---|
| CN | 218685742 | 3/2023 |
| CN | 118402799 | 7/2024 |

NERVE STIMULATOR

CROSS-REFERENCE TO RELATED APPLICATION

The present application claims priority to Chinese Patent Application No. 202411407619.4 entitled "NERVE STIMULATOR" and filed with the CNIPA by BCIFlex Medical Technology Co., Ltd. on Oct. 10, 2024, the content of which is incorporated herein by reference in its entirety.

FIELD

The present disclosure relates to the technical field of medical devices, and in particular, to a nerve stimulator.

BACKGROUND

With the continuous advancement of medical technology, the use of implantable electrical stimulation for treating pain-related symptoms has become increasingly common. An implantable nerve stimulation system typically includes a flexible electrode and a plurality of components. Once implanted in the body, a nerve stimulator will be surrounded by body fluids. In order to ensure normal operation of the implanted nerve stimulation system in the body, it is essential to maintain excellent sealing of components such as feed-through components and connector units within the nerve stimulator. However, sealing between a feed-through component and a mounting cover of the nerve stimulator in the related technology is inadequate, and the nerve stimulator is difficult to achieve a desired effect in the implantation process. In addition, in the practical use, a small amount of body fluids will still enter a shell through electrode seals, and will spread along the electrodes to all conductive rings, therefore causing breakdown of the circuit of the entire conductive assembly, and low reliability. In addition, the sealing structure in the related art is complex, has a large assembly volume, and is not conducive to expanding the number of electrode channels.

SUMMARY

The present disclosure aims to solve at least one of the technical problems existing in the prior art. To this end, an object of the present disclosure is to propose a nerve stimulator which increases the sealing property of the overall structure by forming a multi-layer seal.

In order to achieve the above object, a nerve stimulator is proposed according to an embodiment of the present disclosure. The nerve stimulator includes a mid-shell, a stimulation acquisition module, a feed-through component, a mounting cover, a flexible electrode and a pressure connector. The stimulation acquisition module includes a stimulation and/or acquisition circuit and is mounted within the mid-shell. The feed-through component is disposed on an end surface of the mid-shell and is electrically connected to the stimulation acquisition module. The mounting cover is disposed on the end surface of the mid-shell and covers the feed-through component. The flexible electrode includes a first extension section and a second extension section. The first extension section is of a sheet structure and is provided with a proximal contact portion adapted to be electrically connected to the feed-through component. The second extension section is provided with a lead portion and a distal electrode site portion for applying electrical stimulation to a target tissue and/or recording a target tissue signal, the proximal contact portion and the distal electrode site portion are electrically connected to each other through the lead portion. The first extension section is provided between the mounting cover and the end surface of the mid-shell, and is connected to a side of the feed-through component that is facing toward the mounting cover. The first extension section extends along the end surface of the mid-shell, and the second extension section protrudes from a gap between the mounting cover and the mid-shell. The pressure connector is mounted to the mounting cover, and applies a pressure on the flexible electrode in a direction toward the feed-through component, so as to allow the proximal contact portion of the flexible electrode to be electrically connected to the stimulation acquisition module through the feed-through component. The mounting cover is provided with a side edge extending toward a side surface of the mid-shell, the side edge and the side surface of the mid-shell form a channel for accommodating the flexible electrode, and the second extension section of the flexible electrode extends along the channel and extends out of the channel.

In the nerve stimulator according to the embodiment of the present disclosure, the flexible electrode extends from the end surface of the mid-shell to a side surface of the mid-shell and thus is sealed at its side surface, and the flexible electrode is also sealed in its thickness direction due to being clamped between the pressure connector and the feed-through component. In this way, the sealing property of the overall structure is increased.

According to some specific embodiments of the present disclosure, the feed-through component includes a feed-through end cover and a feed-through body. The feed-through end cover is mounted to the end surface of the mid-shell. The feed-through body is mounted to the feed-through end cover. The feed-through body is provided with a plurality of conductive contacts arranged in an array, an insulating material is provided among the plurality of conductive contacts for isolation. One side of each of the conductive contacts of the feed-through body is electrically connected to the stimulation acquisition module, and the other side of each of the conductive contacts of the feed-through body is electrically connected to the proximal contact portion of the flexible electrode.

According to some specific embodiments of the present disclosure, the feed-through end cover is provided with a first positioning post extending toward the mounting cover, the flexible electrode and the mounting cover each are provided with a first positioning hole corresponding to a position of the first positioning post, the first positioning post of the feed-through end cover passes through the first positioning hole of the flexible electrode to allow the feed-through end cover to be mounted with the flexible electrode, and the first positioning post of the feed-through end cover passes through the first positioning hole of the mounting cover to allow the feed-through end cover to be mounted with the mounting cover.

According to some specific embodiments of the present disclosure, an end cover of the mid-shell is provided with a second positioning post extending toward the mounting cover, the flexible electrode and the mounting cover each are provided with a second positioning hole corresponding to a position of the second positioning post, the second positioning post passes through the flexible electrode to allow the flexible electrode to be mounted to the end cover of the mid-shell, and the second positioning post passes through the mounting cover to allow the mounting cover to be mounted to the end cover of the mid-shell.

According to some specific embodiments of the present disclosure, the pressure connector is provided with a plurality of elastic structures, the elastic structure generates a compressive deformation and applies a pressure on the proximal contact portion of the flexible electrode during installation of the mounting cover with the mid-shell, so as to allow the proximal contact portion of the flexible electrode to be electrically connected to the feed-through body.

Further, the elastic structure of the pressure connector is a metal reed or a metal probe.

Further, the elastic structure of the pressure connector is an elastic polymer bump.

According to some specific embodiments of the present disclosure, the nerve stimulator further includes a first seal gasket that is provided between the mounting cover and the feed-through end cover and that is surrounding and sealing the feed-through body, the proximal contact portion of the flexible electrode is sealed between the pressure connector and the first seal gasket.

According to some specific embodiments of the present disclosure, the nerve stimulator further includes a second seal gasket. The second seal gasket is provided between the mounting cover and an end cover of the mid-shell for sealing the proximal contact portion of the flexible electrode and the feed-through body.

According to some specific embodiments of the present disclosure, the feed-through component further includes a feed-through adapter mounted on a side of the feed-through end cover that is facing the stimulation acquisition module, and the feed-through adapter is electrically connected to the feed-through body. The stimulation acquisition module is provided with a first pin, the first pin is electrically connected to the feed-through body; and/or the stimulation acquisition module is provided with a second pin, the second pin is electrically connected to the feed-through adapter.

Further, the side of the feed-through end cover that is facing the stimulation acquisition module is provided with a first mounting groove, the feed-through adapter is mounted in the first mounting groove. A side of the feed-through end cover that is facing the mounting cover is provided with a second mounting groove, the feed-through body is mounted in the second mounting groove. The feed-through body and the feed-through adapter are electrically connected to each other at the center of the first mounting groove and the center of the second mounting groove.

According to some specific embodiments of the present disclosure, the feed-through end cover is provided with a threaded structure, the mounting cover is provided with a counter bore corresponding to a position of the threaded structure, and the mounting cover and the feed-through end cover are mounted by a fastener passing through the counter bore and being in threaded connection with the threaded structure.

Further, a sealing ring is provided in the counter bore of the mounting cover, and the sealing ring surrounds the fastener.

According to some specific embodiments of the present disclosure, an end cover of the mid-shell is provided with a threaded structure, the mounting cover is provided with a counter bore corresponding to a position of the threaded structure, and the mounting cover and the end cover of the mid-shell are mounted by a fastener passing through the counter bore and being in threaded connection with the threaded structure.

Further, a sealing ring is provided in the counter bore of the mounting cover, and the sealing ring surrounds the fastener.

According to some specific embodiments of the present disclosure, the nerve stimulator further includes a coil module and an antenna module. The coil module and the antenna module are mounted on a side of the mid-shell away from the feed-through component, the antenna module is configured for data interaction with the stimulation acquisition module, and the coil module is configured to charge a battery of the stimulation acquisition module.

Further, the nerve stimulator includes a end shell mounted to one end of the mid-shell. The coil module and the antenna module are mounted to the end shell.

Further, the end shell is an epoxy resin part or a silicone member.

Further, the mid-shell is a titanium alloy member.

According to some specific embodiments of the present disclosure, the flexible electrode is a layered structure. The layered structure includes a first insulating layer, a second insulating layer, and a first conductive layer provided between the first insulating layer and the second insulating layer. The proximal contact portion of the flexible electrode is exposed from the first insulating layer and/or the second insulating layer, and the distal electrode site portion of the flexible electrode is exposed from the first insulating layer and/or the second insulating layer.

According to some specific embodiments of the present disclosure, the first insulating layer is made of polyimide or parylene.

According to some specific embodiments of the present disclosure, the second insulating layer is made of polyimide or parylene.

According to some specific embodiments of the present disclosure, the first conductive layer is made of gold or platinum.

According to some specific embodiments of the present disclosure, the flexible electrode further including a third insulating layer, and a second conductive layer provided between the second insulating layer and the third insulating layer. The proximal contact portion of the flexible electrode is exposed from the first insulating layer and/or the third insulating layer, and the distal electrode site portion of the flexible electrode is exposed from the first insulating layer and/or the third insulating layer.

Additional aspects and advantages of the present disclosure will be given partially in the following description, and will become apparent partially from the following description, or will be known from the practice of the present disclosure.

BRIEF DESCRIPTION OF DRAWINGS

The above and/or additional aspects and advantages of the present disclosure will become apparent and easy to understand from the description of embodiments in conjunction with the accompanying drawings, in which.

REFERENCE NUMERALS nerve stimulator 1, mid-shell 100, stimulation acquisition module 200, feed-through component 300, mounting cover 400, flexible electrode 500, coil module 600, antenna module 700, conductive contact 301, feed-through end cover 310, feed-through body 320, first seal gasket 330, feed-through adapter 340, first positioning post 311, first mounting groove 312, second mounting groove 313, electrode mounting groove 331, side edge 401, first positioning hole 402, counter bore 403, sealing ring 404, pressure connector 410, electrode protection tube 501, first extension section 510, second extension section 520, end shell 601, first insulating layer 11, first conducting layer 12, second insulating layer 13, second conducting layer 14, third insulating layer 15.

DETAILED DESCRIPTION

Embodiments of the present disclosure will be described in detail below, and examples of the embodiments are shown in the attached drawings. Same or similar reference numerals throughout indicate the same or similar elements or elements having the same or similar functions. The following embodiments described with reference to the attached drawings are exemplary and are used only for the purpose of explaining the present application and are not to be construed as limitations of the present application.

In the description of the present disclosure, it is to be understood that, the terms such as "center", "longitudinal", "transverse", "length", "width", "thickness" and "up", "down", "front", "rear", "left", "right", "vertical", "horizontal", "top", "bottom", "inside" and "outside", "axial", "radial" and "circumferential" and so on indicate orientation or positional relations that are on the basis of the orientational or positional relations illustrated in the drawings. Each of those terms is merely for the convenience and simplification of the description of the present disclosure, does not indicate or imply that the indicated device or component must be in a particular orientation or must be constructed and operated in a particular orientation, and therefore cannot be construed as limiting the present disclosure.

In the description of the present disclosure, "first feature" and "second feature" may include one or more of the features.

In the descriptions of the present disclosure, "multiple" means two or more, and "some" means one or more.

A nerve stimulator 1 according to an embodiment of the present disclosure will be described below with reference to the drawings.

As shown in FIG. 1-FIG. 8, a nerve stimulator 1 according to an embodiment of the present disclosure includes a mid-shell 100, a stimulation acquisition module 200, a feed-through component 300, a mounting cover 400, a flexible electrode 500, and a pressure connector 410.

Figure 1:
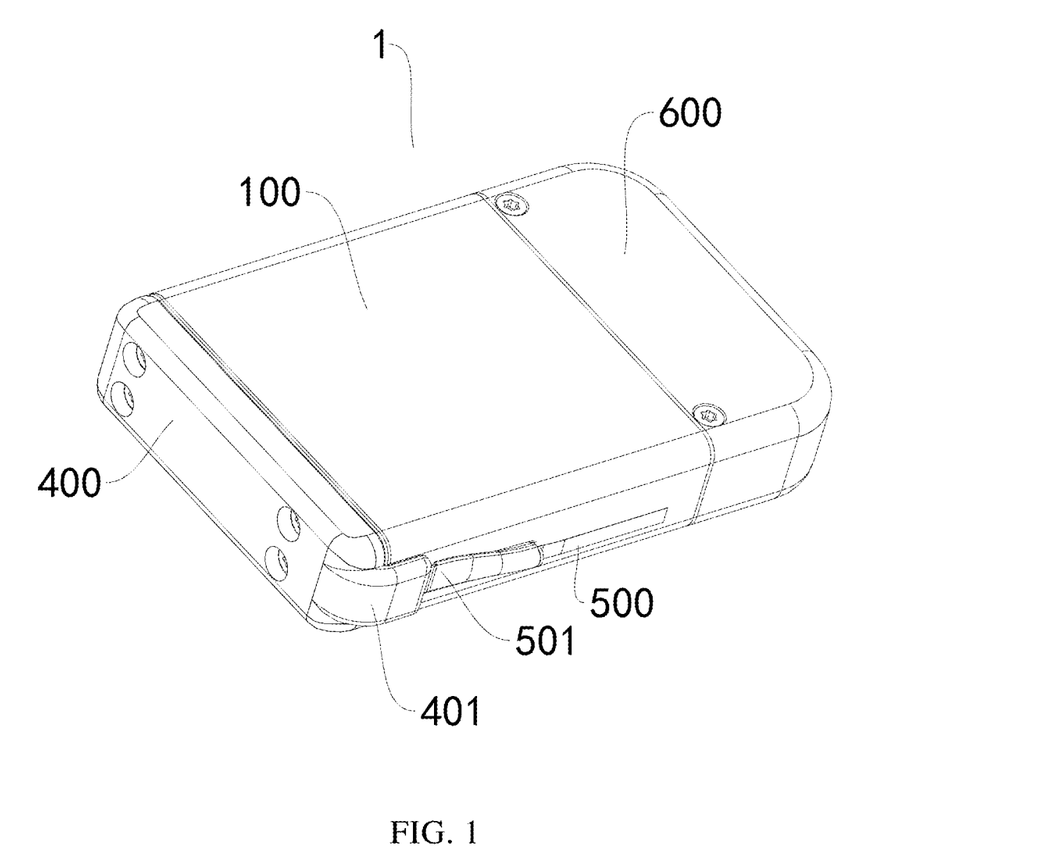
FIG. 1 is a schematic view of a structure of a nerve stimulator according to an embodiment of the present disclosure.
Figure 2:
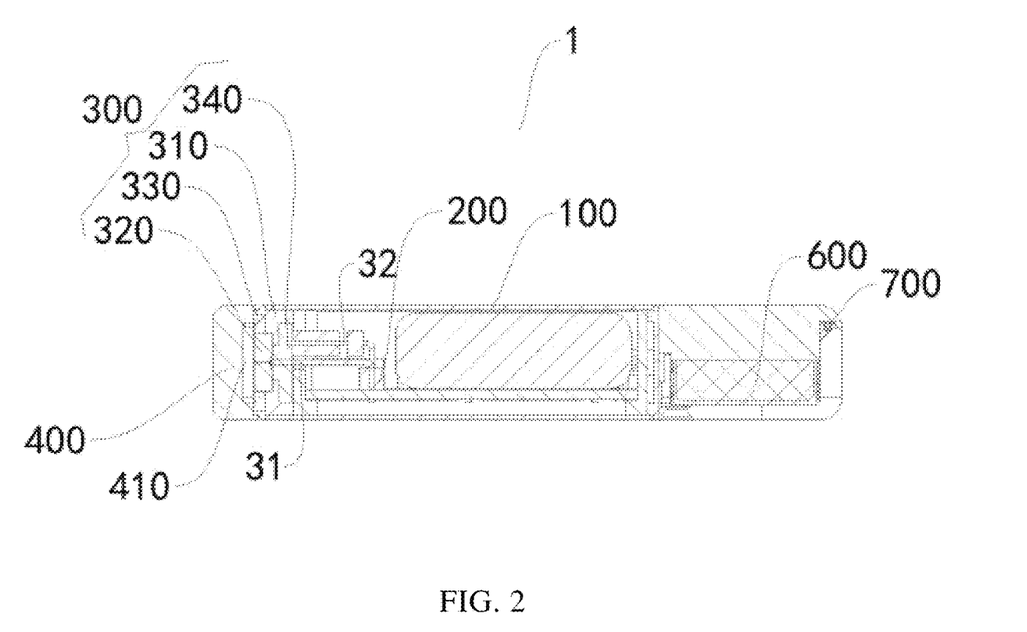
FIG. 2 is a section view of a nerve stimulator according to an embodiment of the present disclosure.

The stimulation acquisition module 200 includes a stimulation and/or acquisition circuit and is mounted within the mid-shell 100. The feed-through component 300 is disposed on an end surface of the mid-shell 100 and is electrically connected to the stimulation acquisition module 200. The mounting cover 400 is disposed on the end surface of the mid-shell 100 and covers the feed-through component 300. The flexible electrode 500 includes a first extension section 510 and a second extension section 520. The first extension section 510 is of a sheet structure and is provided with a proximal contact portion adapted to be electrically connected to the feed-through component 300. The second extension section 520 is provided with a distal electrode site portion for applying electrical stimulation to a target tissue and/or recording a target tissue signal. The proximal contact portion and the distal electrode site portion are electrically connected to each other through a lead portion. The first extension section 510 is provided between the mounting cover 400 and the end surface of the mid-shell 100, is connected to a side of the feed-through component 300 that is facing toward the mounting cover 400, and extends along the end surface of the mid-shell 100. The second extension section 520 protrudes from a gap between the mounting cover 400 and the mid-shell 100. The pressure connector 410 is mounted to the mounting cover 400, and applies a pressure on the flexible electrode 500 in a direction toward the feed-through component 300 so as to allow the proximal contact portion of the flexible electrode 500 to be electrically connected to the stimulation acquisition module 200 through the feed-through component 300.

For example, during the surgical process, after incising the skin of the patient, the implantation position of the flexible electrode 500 is determined. Once the distal electrode site portion of the flexible electrode 500 is implanted to the designated position, the position of the nerve stimulator 1 is determined immediately. An end of the flexible electrode 500 is moved from the subcutaneous position to the position where the nerve stimulator 1 is fixed, and at this time, the proximal contact portion of the flexible electrode 500 is fixedly connected to the nerve stimulator 1, so as to implant the nerve stimulator 1 with the flexible electrode 500 into the human body. Then, the wound is sutured to complete the surgery.

In the nerve stimulator 1 according to the embodiment of the present disclosure, the flexible electrode 500 includes the first extension section 510 and the second extension section 520, the first extension section 510 is provided between the mounting cover 400 and the end surface of the mid-shell 100, and the second extension section 520 protrudes from a gap between the mounting cover 400 and the mid-shell 100, that is the flexible electrode 500 extends from the end surface of the mid-shell 100 to a side surface of the mid-shell. In this way, the pressure connector 410 can evenly exert pressure on the flexible electrode 500 while sealing the flexible electrode 500 between the mounting cover 400 and the mid-shell 100, as well as between the mounting cover 400 and the feed-through component 300, increasing the sealing property of the overall structure.

Figure 3:
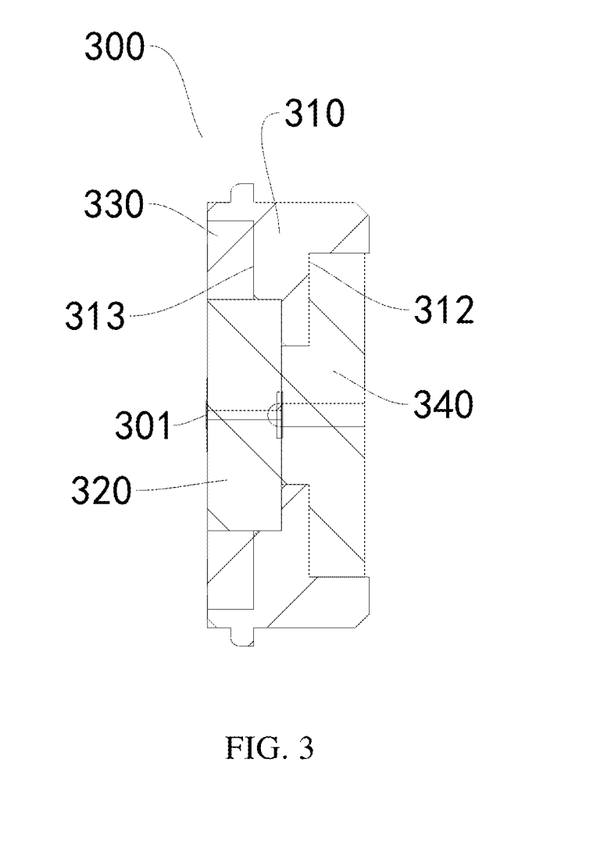
FIG. 3 is a section view of a feed-through component of a nerve stimulator according to an embodiment of the present disclosure.

Further, as shown in FIG. 2 and FIG. 3, the feed-through component 300 includes a feed-through end cover 310 and a feed-through body 320. The feed-through end cover 310 is mounted to the end surface of the mid-shell 100. The feed-through body 320 is mounted to the feed-through end cover 310, and is provided with a plurality of conductive contacts 301 arranged in an array. An insulating material is provided among the plurality of conductive contacts 310 for isolation. One side of each of the conductive contacts 310 of the feed-through body 320 is electrically connected to the stimulation acquisition module 200, and the other side of each of the conductive contacts 310 of the feed-through body 320 is electrically connected to the proximal contact portion of the flexible electrode 500. In this way, the stimulation acquisition module 200 is electrically connected to the proximal contact portion of the flexible electrode 500 via the feed-through body 320.

The flexible electrode 500 is in the form of a sheet, an insulating material is provided among the plurality of conductive contacts 310 for isolation, and the flexible electrode 500 is connected to the plurality of conductive contacts 301. The plurality of conductive contacts 301 arranged in an array can provide a plurality of stimulation points, which means that the nerve can be stimulated more finely and the stimulation precision can be improved. Furthermore, by the plurality of conductive contacts 301, the stimulation can be carried out in a larger area, expanding the effective range of stimulation. In addition, the sheet structure of the flexible electrode 500 makes it possible to fit on the tissue around the nerve, ensuring that the contact between the plurality of stimulation points and the nerve is more accurate, and at the same time ensuring that the contact between the stimulation points and the nerve is more uniform.

The feed-through end cover 310 is mounted on one side of the mid-shell 100 for fixing the feed-through body 320. The feed-through body 320 is mounted at the center of the feed-through end cover 310. One side of the feed-through body 320 is electrically connected to the stimulation acquisition module 200, and the other side of the feed-through body 320 is connected to the flexible electrode 500. A sealing structure is formed between the feed-through end cover 310 and the feed-through body 320, which improves the sealing property of the overall structure. It can effectively prevent external substances such as moisture and dust from entering the interior of the nerve stimulator 1, ensuring the normal operation of the internal circuits and components. At the same time, the multi-layer sealing structure can also effectively protect interior sensitive components such as the stimulation acquisition module 200 and the feed-through component 300, ensuring that they are not affected by the external environment, and improving the safety and reliability of the nerve stimulator 1.

Further, as shown in FIG. 1, the mounting cover 400 is provided with a side edge 401 extending toward a side surface of the mid-shell 100, the side edge 401 and the side surface of the mid-shell 100 form a channel for accommodating the flexible electrode 500, and the second extension section 520 of the flexible electrode 500 extends along the channel and extends out of the channel.

An electrode protection tube 501 is sleeved on the flexible electrode 500. The flexible electrode 500 includes a first extension section 510 and a second extension section 520, the first extension section 510 extends along the end surface of the mid-shell 100, and the second extension section 520 extends along an outer side surface of the mid-shell 100. A side of the electrode protection tube 501 that is sleeved on the first extension section 510 has a sheet structure conforming to the shape of the flexible electrode 500. A side of the electrode protection tube 501 that is sleeved on the second extension section 520 has a sheet structure at an end adjacent to the first extension section 510, and has a tube structure at an end away from the first extension section 510. The electrode protection tube 501 that is sleeved on the outer side of the flexible electrode 500 can protect the flexible electrode 500 from the influence of the external environment, such as abrasion, scratching, etc., to prolong the service life of the flexible electrode 500. At the same time, the existence of the electrode protection tube 501 can reduce the direct contact between the flexible electrode 500 and the surrounding tissues, and further reduce the risk of tissue damage.

Figure 4:
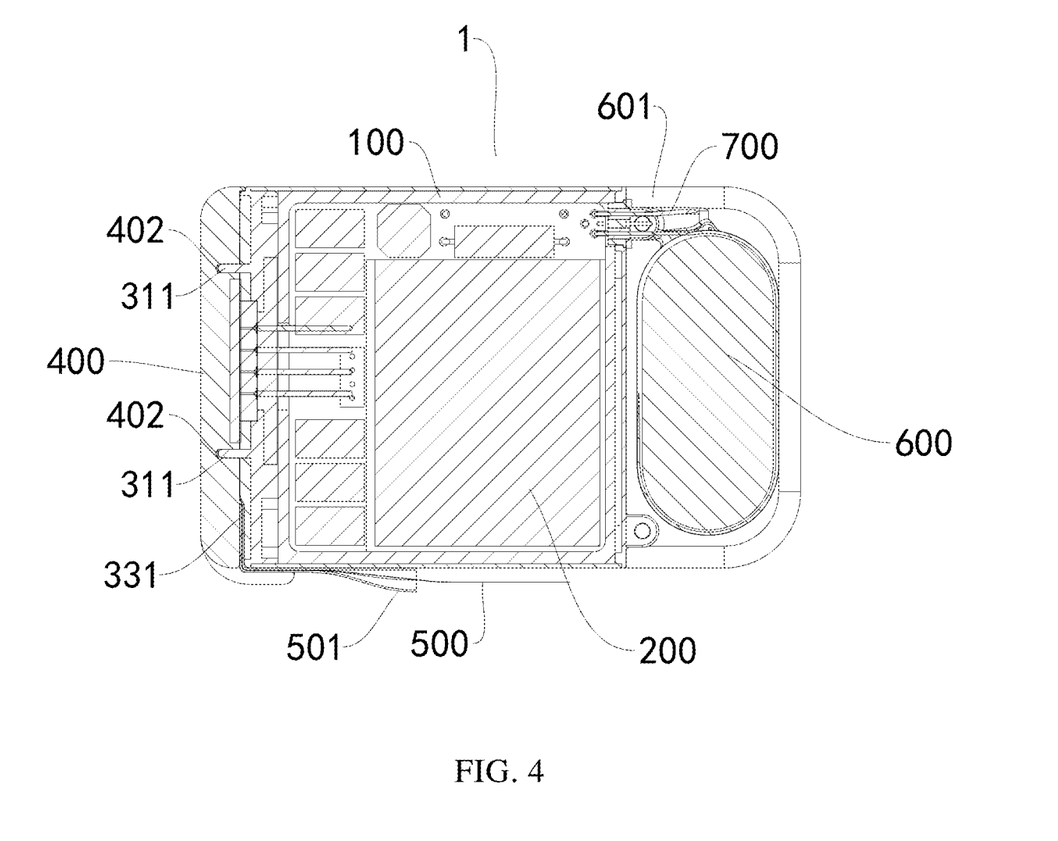
FIG. 4 is a section view of a nerve stimulator in another angle according to an embodiment of the present disclosure.

In some specific embodiments of the present disclosure, as shown in FIG. 4, the feed-through end cover 310 is provided with a first positioning post 311 extending toward the mounting cover 400. The flexible electrode 500 and the mounting cover 400 each are provided with a first positioning hole corresponding to a position of the first positioning post 311. The first positioning post 311 of the feed-through end cover 310 passes through the first positioning hole 503 of the flexible electrode 500 to allow the feed-through end cover 310 to be mounted with the flexible electrode 500, and the first positioning post 311 of the feed-through end cover 310 passes through the first positioning hole 402 of the mounting cover 400 to allow the feed-through end cover 310 to be mounted with the mounting cover 400.

The cooperation of the first positioning post 311 with the first positioning hole 402 ensures accurate docking between the feed-through end cover 310 and the mounting cover 400. This accurate docking helps to ensure the correct positioning of the internal components such as the feed-through body 320 and the flexible electrode 500, reducing assembly errors. At the same time, the first positioning post 311 can provide additional mechanical support to enhance the overall stability of the feed-through end cover 310 and the mounting cover 400. This supporting effect can prevent displacement of the structure due to external shock or vibration, and ensure the reliability of the nerve stimulator 1 in use.

Furthermore, by using structures such as the first positioning post 311 and the corresponding first positioning holes 402 and 503, the assembly process can be simplified. An installation personnel can easily align the feed-through end cover 310 with the mounting cover 400, improving the assembly efficiency and reducing the assembly time. In addition, the first positioning post 311 passes through the flexible electrode 500 and then is installed with the mounting cover 400, which helps to enhance the sealing property. By fastening the first positioning post 311, it can be ensured that the feed-through component 300 is maintained at a good compression state at the joint, thereby realizing a good sealing property.

In some other specific embodiments of the present disclosure, an end cover of the mid-shell 100 is provided with a second positioning post (not shown in the drawings) extending toward the mounting cover 400, the flexible electrode 500 and the mounting cover 400 each are provided with a second positioning hole (not shown in the drawings) corresponding to a position of the second positioning post. The second positioning post passes through the flexible electrode 500 to allow the flexible electrode 500 to be mounted to the end cover of the mid-shell 100, and the second positioning post passes through the mounting cover 400 to allow the mounting cover 400 to be mounted to the end cover of the mid-shell 100.

As a result, since the second positioning post passes through and cooperates with the second positioning hole, the feed-through component 300 is clamped between and sealed between the mounting cover 400 and the mid-shell 100, which can ensure that the feed-through component 300 is maintained at a good compression state at the joint, thereby realizing a good sealing property.

In some specific embodiments of the present disclosure, the pressure connector 410 is provided with a plurality of elastic structures (not shown in the drawings), the elastic structure generates a compressive deformation and applies a pressure on the proximal contact portion of the flexible electrode 500 during installation of the mounting cover 400 with the mid-shell 100, so as to allow the proximal contact portion of the flexible electrode 500 to be electrically connected to the feed-through body 320.

Further, the elastic structure of the pressure connector 410 is a metal reed or a metal probe.

Further, the elastic structure of the pressure connector 410 is an elastic polymer bump.

The pressure connector 410 applies pressure evenly, so as to increase the contact area and pressure between the pressure connector 410 and the feed-through body 320, so that the proximal contact portion of the flexible electrode 500 is stably electrically connected to the feed-through body 320.

In some specific embodiments of the present disclosure, the nerve stimulator 1 further includes a first seal gasket 330. The first seal gasket 330 is provided between the mounting cover 400 and the feed-through end cover 310 and surrounds and seals the feed-through body 320, the proximal contact portion of the flexible electrode 500 is sealed between the pressure connector 410 and the first seal gasket 330.

The first seal gasket 330 surrounds and seals an outer peripheral side of the feed-through body 320 to ensure sealing between the feed-through body 320 and the feed-through end cover 310, forming a first layer of sealing. Furthermore, a sealing between the feed-through body 320 and the first seal gasket 330 can be added, forming a second layer of sealing. The mounting cover 400 is mounted on the end surface of the mid-shell 100 and covers an outer side of the feed-through component 300 for enclosing the feed-through component 300. The first seal gasket 330 not only surrounds and seals the outer peripheral side of the feed-through body 320, but also is sealed by the feed-through end cover 310 and the mounting cover 400 in the thickness direction, forming a third layer of sealing. A multi-layer sealing structure is formed among the feed-through end cover 310, the feed-through body 320 and the first seal gasket 330, which improves the sealing property of the overall structure. The multi-layer sealing structure can effectively prevent external substances, such as moisture and dust, from entering the interior of the nerve stimulator 1, ensuring the normal operation of the internal circuits and components. At the same time, the multi-layer sealing structure can also effectively protect the internal stimulation acquisition module 200, the feed-through component 300, and other sensitive components, ensuring that they are not affected by the external environment, and thus improving the safety and reliability of the nerve stimulator 1.

Further, as shown in FIG. 4, the first seal gasket 330 is provided with an electrode mounting groove 331, the electrode mounting groove 331 extends to an edge of the side of the first seal gasket 330 that is facing toward the side edge 401, and the electrode protection tube 501 is disposed within the electrode mounting groove 331 and extends to the electrode channel. The first seal gasket 330 may be made of a flexible material, its thickness changes in response to a change in the force applied on the first seal gasket 330. The electrode mounting groove 331 can accommodate the electrode protection tube 501 so as to allow the electrode protection tube 501 to be in a better close-contact with the first seal gasket 330, thereby improving the sealing property of the overall structure of the nerve stimulator 1. At the same time, the electrode mounting groove 331 can provide a stable mounting position for the electrode protection tube 501, which helps maintain the fixity and stability of the electrode protection tube 501. By setting the electrode protection tube 501 within the electrode mounting groove 331, damage caused by movement or vibration can be effectively reduced. In addition, by setting the electrode protection tube 501 within the electrode mounting groove 331, the installation process can be simpler and more efficient. This structure facilitates accurate positioning of the electrode protection tube 501 during assembly, reducing assembly time and complexity. In addition, the structure of the electrode mounting groove 331 can help to evenly distribute the pressure on the first seal gasket 330, improve the sealing effect and reduce the localized stress concentration, so as to prevent the damage or aging of the first seal gasket 330.

In other embodiments, the nerve stimulator 1 further includes a second seal gasket (not shown in the figures), the second seal gasket is provided between the mounting cover 400 and the end cover of the mid-shell 100 for sealing the proximal contact portion of the flexible electrode 500 and the feed-through body 320. For example, the second seal gasket can surround and seal the outer peripheral side of the feed-through component 300 so as to make the feed-through body 320 form a fully closed structure, ensuring a good leak proofness.

In some specific embodiments of the present disclosure, as shown in FIG. 2, the feed-through component 300 further includes a feed-through adapter 340. The feed-through adapter 340 is mounted on a side of the feed-through end cover 310 that is facing the stimulation acquisition module 200, and the feed-through adapter 340 is electrically connected to the feed-through body 320. The stimulation acquisition module 200 is provided with a first pin 31, the first pin 31 is electrically connected to the feed-through body 320, and/or the stimulation acquisition module 200 is provided with a second pin 32, the second pin 32 is electrically connected to the feed-through adapter 340.

That is, both the first pin 31 and the second pin 32 of the stimulation acquisition module 200 may be connected to the feed-through body 320, and when one of the first pin 31 and the second pin 32 is connected to the feed-through body 320, the other of the first pin 31 and the second pin 32 is connected to the feed-through adapter 340.

By setting the first pin 31 and the second pin 32, different devices can be flexibly connected and switched according to different needs and application scenarios, improving the compatibility and applicability of the nerve stimulator 1. This structure makes the circuit design more flexible, allowing the best electrical connection to be selected according to the needs and optimizing the performance of the circuit.

In some specific embodiments of the present disclosure, as shown in FIG. 3, the side of the feed-through end cover 310 that is facing the stimulation acquisition module is provided with a first mounting groove 312, the feed-through adapter 340 is mounted in the first mounting groove 312. A side of the feed-through end cover 310 that is facing the mounting cover 400 is provided with a second mounting groove 313, the feed-through body 320 is mounted in the second mounting groove 313, and the feed-through body 320 and the feed-through adapter 340 are electrically connected to each other at the center of the first mounting groove 312 and the center of the second mounting groove 313.

The feed-through adapter 340 is configured to be mounted in the first mounting groove 312, ensuring an electrical connection between the feed-through adapter 340 and the stimulation acquisition module 200. The feed-through body 320 is configured to be mounted in second mounting groove 313, ensuring an electrical connection between the feed-through body 320 and the flexible electrode 500. The feed-through body 320 and the feed-through adapter 340 are electrically connected to each other at the center of the first mounting groove 312 and the center of the second mounting groove 313 to ensure a reliable electrical connection between them for signal and energy transmission.

When the mounting cover 400 is installed with the mid-shell 100, the pressure connector 410 exerts pressure on the flexible electrode 500. The presence of the pressure connector 410 can effectively press the flexible electrode 500 onto the feed-through body 320, and this physical compression ensures a close contact between the flexible electrode 500 and the feed-through body 320, thereby realizing a reliable electrical connection and reducing the risk of poor contact. In addition, the pressure exerted by the pressure connector 410 can, to a certain extent, compensate for the minor unevenness between the flexible electrode 500 and the feed-through body 320, thereby improving the connection stability, ensuring smooth conveyance of the electric current in the process of use, and avoiding disconnection due to vibration or movement. At the same time, the pressure connector 410 can effectively reduce the contact resistance, so as to make the transmission of electric signals smoother, thereby enhancing the overall performance of the nerve stimulator 1 and ensuring the therapeutic effect.

In some specific embodiments of the present disclosure, the pressure connector 410 is made of a flexible material, the thickness of which changes in response to a change in force on it. Since the pressure connector 410 is made of a flexible material, it can elastically deform in response to the exerted pressure. This ensures that an appropriate pressure is applied between the mounting cover 400 and the feed-through component 300 to firmly maintain an electrical connection between the flexible electrode 500 and the feed-through body 320, thereby improving the quality of the electrical connection.

Figure 5:
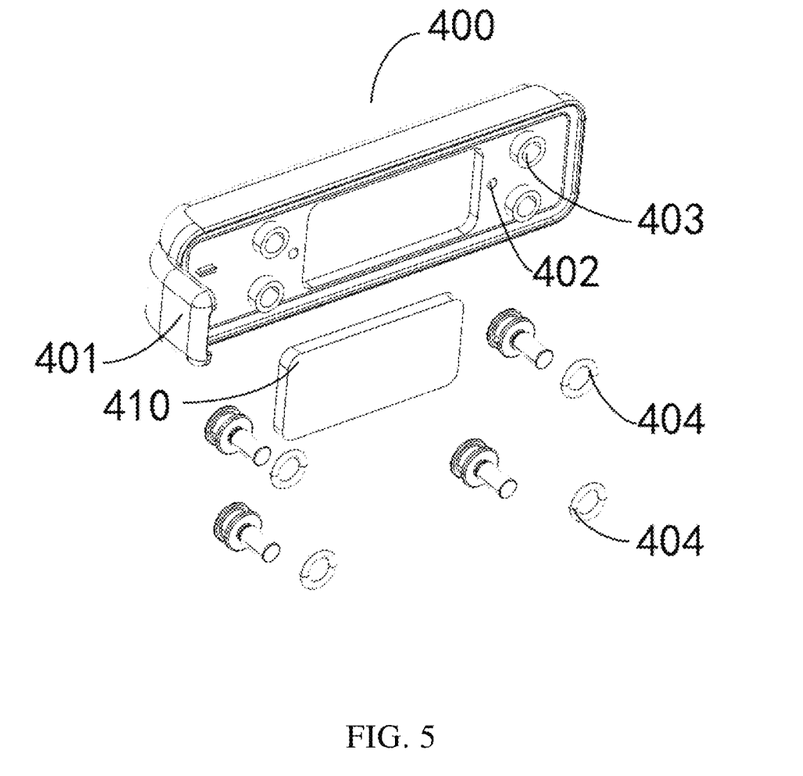
FIG. 5 shows a structure of a mounting cover of a nerve stimulator according to an embodiment of the present disclosure.
Figure 6:
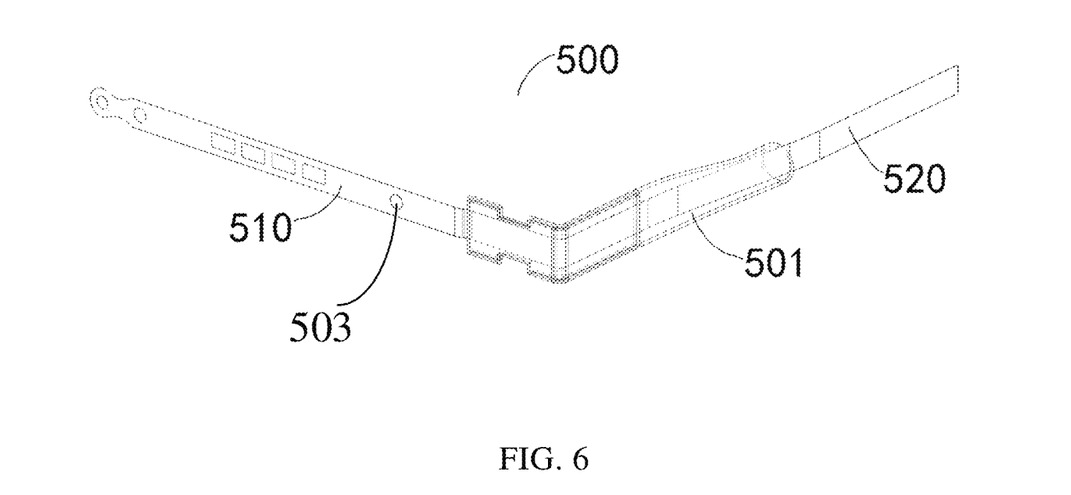
FIG. 6 is a schematic view of a structure of a flexible electrode of a nerve stimulator according to an embodiment of the present disclosure.
Figure 7:
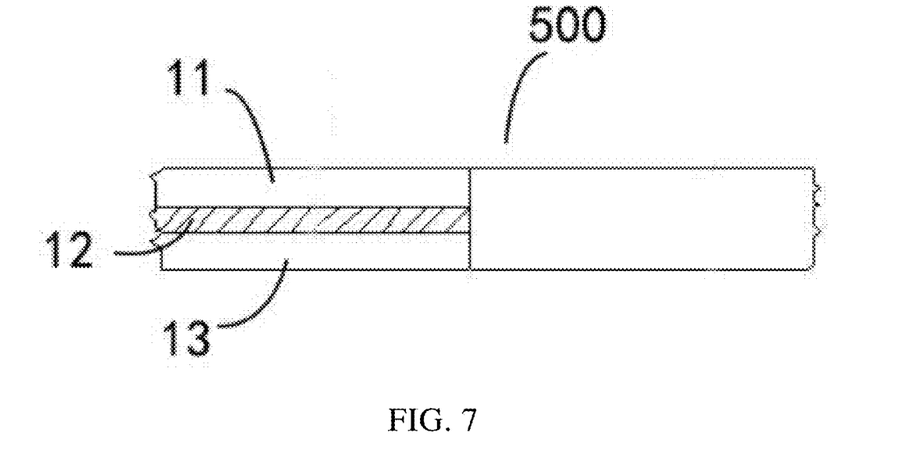
FIG. 7 is a section view of a flexible electrode of a nerve stimulator according to an embodiment of the present disclosure.
Figure 8:
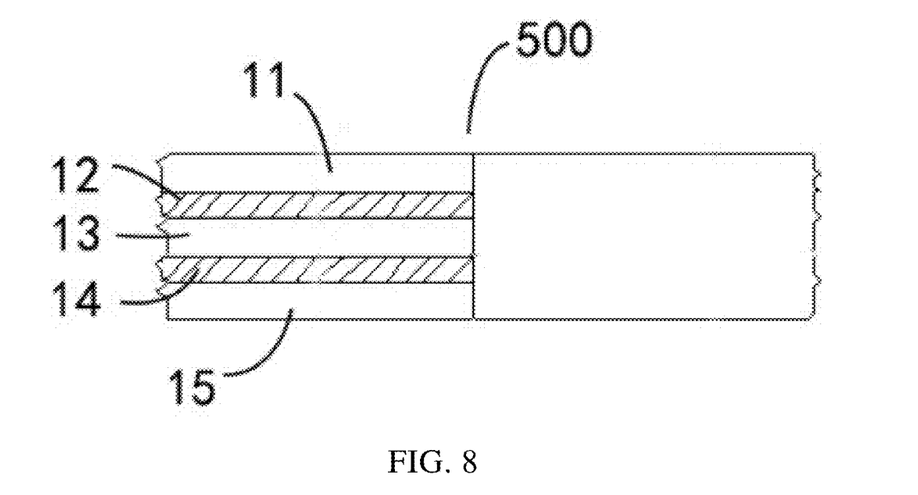
FIG. 8 is a section view of a flexible electrode of a nerve stimulator according to another embodiment of the present disclosure.

In some specific embodiments of the present disclosure, as shown in FIG. 5, the feed-through end cover 310 is provided with a threaded structure, the mounting cover 400 is provided with a counter bore 403, and the mounting cover 400 and the feed-through end cover 310 are mounted by a fastener passing through the counter bore 403 and being in threaded connection with the threaded structure. Threaded structures are symmetrically provided on both sides of the first positioning post 311, and the positions of the threaded structures correspond to positions of the counter bores 403. The counter bore 403 can provide better positioning for the fasteners, avoiding the fasteners from being off-centered during installation, making the docking between the mounting cover 400 and the feed-through end cover 310 more accurate, and ensuring the correct positioning of the internal components. In addition, as shown in FIG. 7 and FIG. 8, first positioning posts 311 may be provided around the feed-through body 320.

Further, a sealing ring 404 is provided in the counter bore 403 of the mounting cover 400, and the sealing ring surrounds the fastener.

The sealing ring 404 surrounds the fastener, and forms a good sealing effect with the mounting cover 400 and the feed-through end cover 310, thereby effectively protecting the internal electronic components from moisture and contamination, and improving the durability of the device. In addition, this threaded connection structure makes the installation and removal process simple and convenient. Users only need to use the corresponding tools to screw down or loosen the fastener for assembly or maintenance, thereby enhancing the user experience.

In other embodiments, an end cover of the mid-shell 100 is provided with a threaded structure, the mounting cover 400 is provided with a counter bore corresponding to a position of the threaded structure, and the mounting cover 400 and the end cover of the mid-shell 100 are mounted by a fastener passing through the counter bore and being in threaded connection with the threaded structure. Through the threaded structure corresponding to the counter bore, the fastener installs the mid-shell 100 and the mounting cover 400 together. In this way, it can achieve installation of the mounting cover 400 and the mid-shell 100 together.

Further, a sealing ring 404 is provided in the counter bore of the mounting cover 400, and the sealing ring 404 surrounds the fastener. It enables a good sealing effect to be formed between the mounting cover 400 and the feed-through end cover 310, and can effectively protect the internal electronic components from moisture and contamination and improve the durability of the device.

In some specific embodiments of the present disclosure, as shown in FIG. 4, the nerve stimulator 1 further includes a coil module 600 and an antenna module 700. The coil module 600 and the antenna module 700 are mounted on a side of the mid-shell 100 away from the feed-through component 300, the antenna module 700 is configured for data interaction with the stimulation acquisition module 200, and the coil module 600 is configured to charge a battery of the stimulation acquisition module 200. Herein, the coil module 600 and the antenna module 700 together are mounted in a coil base after being electrically connected, and are fixed inside the mid-shell 100 by fasteners. The coil module 600 serves as an energy receiving end, which ensures that the nerve stimulator 1 can obtain energy in a non-contact manner after being implanted in the human body, and the antenna module 700 is used for wireless data interaction with the stimulation acquisition module 200.

The antenna module 700 is able to receive and send data to ensure that the various parts of the device can communicate in real time, allowing the nerve stimulator 1 to adjust the output stimulation parameters as required. Through wireless signals, the antenna module 700 allows an external device, such as a smartphone or computer, to remotely monitor and control the nerve stimulator 1. This provides a more flexible and convenient managing way for users. At the same time, the antenna module 700 can transmit the operating status and health data of the device, enable the doctor or the user to obtain the relevant information in real time, and to adjust the use strategy or perform maintenance timely.

In some specific embodiments of the present disclosure, as shown in FIG. 4, the nerve stimulator 1 further includes an end shell 601, the end shell 601 is mounted to one end of the mid-shell 100, the coil module 600 and the antenna module 700 are mounted to the end shell 601. Further, the end shell 601 is an epoxy resin member or a silicone member, which will not affect the signal transmission, has better compatibility, and reduces interference with the stimulation acquisition module.

Further, the end shell 601 is an epoxy resin member or a silicone member. The mid-shell 100 is a titanium alloy member.

By constructing the mid-shell 100 as the titanium alloy member and constructing the end shell 601 as the epoxy resin member or the silicone member, it is possible to prevent a better nuclear-magnetic compatibility between the parts within the mid-shell 100 and the end shell 601, and to prevent electromagnetic interference. There will be no mutual conduction of the heat generated within the mid-shell 100 and the heat generated in the end shell 601, and the heat generated by the coil module 600 can be quickly dissipated. In this way, it can improve the heat dissipation efficiency and will not affect the operation of the acquisition stimulation module 200 within the mid-shell 100.

In some specific embodiments of the present disclosure, as shown in FIG. 7, the flexible electrode 500 is a layered structure that includes a first insulating layer 11, a second insulating layer 13, and a first conductive layer 12.

The first conductive layer 12 is provided between the first insulating layer 11 and the second insulating layer 13. The proximal contact portion of the flexible electrode 500 is exposed from the first insulating layer 11 and/or the second insulating layer 13. The distal electrode site portion of the flexible electrode 500 is exposed from the first insulating layer 11 and/or the second insulating layer 13.

The proximal contact portion is exposed from the first insulating layer 11 and the second insulating layer 13 to be electrically connected to the feed-through component 300, and then is electrically connected to the stimulation acquisition module. The distal electrode site portion is exposed from the first insulating layer 11 and the second insulating layer 13 to be electrically connected to a target tissue. Therefore, the proximal contact portion and the distal electrode site portion of the flexible electrode 500 are in conducting state, enabling the stimulation acquisition module to perform acquisition and stimulation on the target tissue.

In some embodiments, the first insulating layer 11 is made of polyimide or parylene. Further, the second insulating layer 13 is made of polyimide or parylene. The first conductive layer 12 is made of gold or platinum.

In some specific embodiments of the present disclosure, as shown in FIG. 8, the flexible electrode 500 is a layered structure and further includes a third insulating layer 15 and a second conductive layer 14, the second conductive layer 14 is provided between the second insulating layer 13 and the third insulating layer 15.

The proximal contact portion of the flexible electrode 500 is exposed from the first insulating layer 11 and the third insulating layer 15. The distal electrode site portion of the flexible electrode 500 is exposed from the first insulating layer 11 and/or the third insulating layer 15. The first conductive layer 12 and the second conductive layer 14 are exposed to conduct electricity respectively.

In some specific embodiments of the present disclosure, the mid-shell 100 is made of a titanium alloy member having high biocompatibility with the target tissue where the nerve stimulator is implanted.

Other compositions as well as operations according to embodiments of the present disclosure are known to those of ordinary skill in the art and will not be described herein in detail.

In the illustration of this description, an illustration with reference to the terms "one embodiment", "some embodiments", "illustrative embodiments", "an example", "a particular example" or "some examples" and so on mean that a particular feature, structure, material, or characteristic described in connection with the embodiment(s) or example(s) is included in at least one embodiment or example of the present disclosure. In this description, the exemplary expressions of the above terms do not necessarily specify the same embodiments or examples.

Although embodiments of the present disclosure have been shown and described, it will be understood by those skilled in the art that various changes, modifications, alternations and variations may be made to these embodiments without departing from the principles and spirit of the present disclosure, the scope of which is defined by the claims and their equivalents.

What is claimed is:

1. A nerve stimulator, comprising:
   a mid-shell;
   a stimulation acquisition module, the stimulation acquisition module comprising a stimulation and/or acquisition circuit and being mounted within the mid-shell;
   a feed-through component, the feed-through component being disposed on an end surface of the mid-shell and being electrically connected to the stimulation acquisition module;
   a mounting cover, the mounting cover being disposed on the end surface of the mid-shell and covering the feed-through component;
   a flexible electrode comprising a first extension section and a second extension section, the first extension section being of a sheet structure and being provided with a proximal contact portion adapted to be electrically connected to the feed-through component, the second extension section being provided with a lead portion and a distal electrode site portion for applying electrical stimulation to a target tissue and/or recording a target tissue signal, the proximal contact portion and the distal electrode site portion being electrically connected to each other through the lead portion, the first extension section being provided between the mounting cover and the end surface of the mid-shell, the first extension section being connected to a side of the feed-through component that is facing toward the mounting cover, and the first extension section extending along the end surface of the mid-shell, and the second extension section protruding from a gap between the mounting cover and the mid-shell;
   a pressure connector, the pressure connector being mounted to the mounting cover, the pressure connector applying a pressure on the flexible electrode in a direction toward the feed-through component, so as to allow the proximal contact portion of the flexible electrode to be electrically connected to the stimulation acquisition module through the feed-through component,
   wherein the mounting cover is provided with a side edge extending toward a side surface of the mid-shell, the side edge and the side surface of the mid-shell form a channel for accommodating the flexible electrode, and the second extension section of the flexible electrode extends along the channel and extends out of the channel.

2. The nerve stimulator according to claim 1, wherein the feed-through component comprises:
   a feed-through end cover mounted to the end surface of the mid-shell;
   a feed-through body mounted to the feed-through end cover, the feed-through body being provided with a plurality of conductive contacts arranged in an array, an insulating material being provided among the plurality of conductive contacts for isolation, one side of each of the conductive contacts of the feed-through body being electrically connected to the stimulation acquisition module, and the other side of each of the conductive contacts of the feed-through body being electrically connected to the proximal contact portion of the flexible electrode.

3. The nerve stimulator according to claim 2, wherein the feed-through end cover is provided with a first positioning post extending toward the mounting cover, the flexible electrode and the mounting cover each are provided with a first positioning hole corresponding to a position of the first positioning post, the first positioning post of the feed-through end cover passes through the first positioning hole of the flexible electrode to allow the feed-through end cover to be mounted with the flexible electrode, and the first positioning post of the feed-through end cover passes through the first positioning hole of the mounting cover to allow the feed-through end cover to be mounted with the mounting cover.

4. The nerve stimulator according to claim 2, wherein an end cover of the mid-shell is provided with a second positioning post extending toward the mounting cover, the flexible electrode and the mounting cover each are provided with a second positioning hole corresponding to a position of the second positioning post, the second positioning post passes through the flexible electrode to allow the flexible electrode to be mounted to the end cover of the mid-shell, and the second positioning post passes through the mounting cover to allow the mounting cover to be mounted to the end cover of the mid-shell.

5. The nerve stimulator according to claim 2, wherein the pressure connector is provided with a plurality of elastic structures, the elastic structure generates a compressive deformation and applies a pressure on the proximal contact portion of the flexible electrode during installation of the mounting cover with the mid-shell, so as to allow the proximal contact portion of the flexible electrode to be electrically connected to the feed-through body.

6. The nerve stimulator according to claim 5, wherein the elastic structure of the pressure connector is a metal reed or a metal probe.

7. The nerve stimulator according to claim 6, wherein the elastic structure of the pressure connector is an elastic polymer bump.

8. The nerve stimulator according to claim 2, further comprising:
a first seal gasket provided between the mounting cover and the feed-through end cover and surrounding and sealing the feed-through body, the proximal contact portion of the flexible electrode is sealed between the pressure connector and the first seal gasket.

9. The nerve stimulator according to claim 2, further comprising:
a second seal gasket, the second seal gasket being provided between the mounting cover and an end cover of the mid-shell for sealing the proximal contact portion of the flexible electrode and the feed-through body.

10. The nerve stimulator according to claim 2, the feed-through component further comprises a feed-through adapter mounted on a side of the feed-through end cover that is facing the stimulation acquisition module, and the feed-through adapter is electrically connected to the feed-through body;
wherein the stimulation acquisition module is provided with a first pin, the first pin is electrically connected to the feed-through body; and/or
the stimulation acquisition module is provided with a second pin, the second pin is electrically connected to the feed-through adapter.

11. The nerve stimulator according to claim 10, wherein the side of the feed-through end cover that is facing the stimulation acquisition module is provided with a first mounting groove, the feed-through adapter is mounted in the first mounting groove;
a side of the feed-through end cover that is facing the mounting cover is provided with a second mounting groove, the feed-through body is mounted in the second mounting groove, and the feed-through body and the feed-through adapter are electrically connected to each other at the center of the first mounting groove and the center of the second mounting groove.

12. The nerve stimulator according to claim 2, wherein the feed-through end cover is provided with a threaded structure, the mounting cover is provided with a counter bore corresponding to a position of the threaded structure, and the mounting cover and the feed-through end cover are mounted by a fastener passing through the counter bore and being in threaded connection with the threaded structure.

13. The nerve stimulator according to claim 12, wherein a sealing ring is provided in the counter bore of the mounting cover, and the sealing ring surrounds the fastener.

14. The nerve stimulator according to claim 12, wherein an end cover of the mid-shell is provided with a threaded structure, the mounting cover is provided with a counter bore corresponding to a position of the threaded structure, and the mounting cover and the end cover of the mid-shell are mounted by a fastener passing through the counter bore and being in threaded connection with the threaded structure.

15. The nerve stimulator according to claim 14, wherein a sealing ring is provided in the counter bore of the mounting cover, and the sealing ring surrounds the fastener.

16. The nerve stimulator according to claim 1, further comprising:
a coil module and an antenna module, the coil module and the antenna module being mounted on a side of the mid-shell away from the feed-through component, the antenna module being configured for data interaction with the stimulation acquisition module, and the coil module being configured to charge a battery of the stimulation acquisition module.

17. The nerve stimulator according to claim 16, further comprising:
an end shell, the end shell mounted to one end of the mid-shell, the coil module and the antenna module being mounted to the end shell.

18. The nerve stimulator according to claim 1, the flexible electrode is a layered structure comprising:
a first insulating layer;
a second insulating layer; and
a first conductive layer provided between the first insulating layer and the second insulating layer;
wherein the proximal contact portion of the flexible electrode is exposed from the first insulating layer and/or the second insulating layer, and
wherein the distal electrode site portion of the flexible electrode is exposed from the first insulating layer and/or the second insulating layer.

19. The nerve stimulator according to claim 18, wherein the first insulating layer is made of polyimide or parylene; and/or
the second insulating layer is made of polyimide or parylene; and/or
the first conductive layer is made of gold or platinum.

20. The nerve stimulator according to claim 18, further comprising:
a third insulating layer; and
a second conductive layer provided between the second insulating layer and the third insulating layer;

wherein the proximal contact portion of the flexible electrode is exposed from the first insulating layer and/or the third insulating layer, and wherein the distal electrode site portion of the flexible electrode is exposed from the first insulating layer and/or the third insulating layer.

\* \* \* \* \*